United States Patent [19]
Scott

[11] Patent Number: 5,147,154
[45] Date of Patent: Sep. 15, 1992

[54] PRESSURE REGULATION APPARATUS INCLUDING COOPERATING VALVE MEMBER AND AIR DAM MEANS

[75] Inventor: Lowell Scott, Burlington, Ky.

[73] Assignee: Hamilton Air Products, Fairfield, Ohio

[21] Appl. No.: 681,923

[22] Filed: Apr. 8, 1991

[51] Int. Cl.[5] .............................................. B65G 51/00
[52] U.S. Cl. .................................. 406/112; 137/102; 137/566; 417/2; 417/427
[58] Field of Search .......................... 406/13, 112, 153; 137/102, 566; 417/2, 427

[56] References Cited

U.S. PATENT DOCUMENTS 3,053,475  9/1962  Tonne ............................. 406/112 X

OTHER PUBLICATIONS

Skilcraft Security Equipment Company pamphlet, no date.
Mercury Tube Systems drawing, no date.

*Primary Examiner*—Margaret A. Focarino
*Assistant Examiner*—Andrew C. Pike
*Attorney, Agent, or Firm*—Beveridge, DeGrandi & Weilacher

[57] ABSTRACT

A pressure regulation apparatus, for a bi-directional pneumatic transportation system, has first, second, and third flow chambers with ports provided at two of the chambers. A pumping device alternatively pumps air from the chamber lacking a port to either of the ported chambers. An air dam cooperates with a valve assembly that responds to internal pressures induced by the pumping device to separate one of the ported chambers into sub-chambers and to selectively isolate one of the sub-chambers from the other to bi-directionally control air flow between the ports. The bi-directional pneumatic transportation system in accordance with the present invention incorporates such a pressure regulation apparatus to control transportation of an item between stations connected by a pneumatic tube network.

20 Claims, 3 Drawing Sheets

PRESSURE REGULATION APPARATUS INCLUDING COOPERATING VALVE MEMBER AND AIR DAM MEANS

BACKGROUND OF THE INVENTION

The present invention relates to a pressure regulation apparatus ideally suited for controlling transportation of materials in either of at least two directions. The present invention further relates to a bi-directional mode carrier transportation system suitable for use in a pneumatic tube system.

In transporting of items through a pneumatic tube system, it is desirable to bi-directionally drive the system. The medium in the system therefore moves the item to a remote location while it is directed in one flow direction, and then returns the item to an origin location when the direction of medium flow is reversed. Various valve mechanisms for providing bi-directional fluid flow have been developed. For example, U.S Pat. No. 3,039,491 discloses a valve mechanism which includes two valve members The position of the first of the valve members is controlled by a solenoid. The solenoid regulates the positions of pilot valve members which in turn open or close bleed passages to position the first valve member.

A fluid-switching valve is disclosed in U.S. Pat. No. 3,722,525 as automatically reversing its position in response to flow conditions to selectively distribute pressure to selected outputs. According to U.S. Pat. No. 3,722,575, back pressure in the system will cause a diaphragm to shift and alternately open two valve disks.

SUMMARY OF THE INVENTION

The present invention provides a pressure regulation apparatus and a pneumatic transport tube system incorporating such regulation apparatus. The pressure regulation apparatus is suitable for controlling pressure in a pneumatic tube system to bi-directionally transport items, such as a bank carrier tube, through the pneumatic tube system. The regulation apparatus utilizes relatively high and low air pressures developed within different chambers to control a valve and thereby provide the air flow in the desired direction without relying upon motorized valving elements. It is contemplated that the regulation apparatus according to the invention is suitable for high volume, low pressure control, and low volume, high pressure applications.

The pressure regulation apparatus in accordance with the present invention has three flow chambers, including an upper flow chamber, a lower flow chamber, and a central flow chamber. One of the flow chambers has an air dam provided therein to effectively divide it into two sub-chambers. In the preferred embodiments, the upper and lower chambers communicate with the central chamber via two bores through interior walls in the apparatus, and two pumps. The upper chamber has a work port connectable to a pneumatic tube system, while the lower chamber has an air intake/exhaust port. A spool-type valve member is provided to cooperate with the air dam to alternatively obstruct or open one of the sub-chambers to control bi-directional air flow within the apparatus and therefore within the pneumatic tube system incorporating the apparatus. The position of the spool-type valve member is controlled only by air pressures developed within the chambers. The present invention thus provides a highly reliable pressure regulation apparatus, and a bi-directional transport system which is inexpensive, and is highly reliable.

The pressure regulation apparatus of the present invention can move a carrier through a pneumatic tube system simply by controlling the ON and OFF conditions of the pump means of the apparatus. In the preferred embodiments, when one pump of the pump means is activated, a spool-type valve moves downwardly to isolate one sub-chamber of the lower chamber from the other sub-chamber thereof. Air is conducted from the intake/exhaust port into the non-isolated sub-chamber of the lower chamber, and from there it proceeds through an opening into the central chamber as a supply for the operating pump. The operating pump intakes air from the central chamber and drives it through the upper chamber into a pneumatic tube system via a work port to, for example, push a carrier through the system. To reverse the direction of air flow in the system and cause the carrier to return, the other pump is operated whereby air is forced into the lower chamber, increasing the air pressure in the lower chamber. The increased pressure acts with the air dam to push the valve means upwards and thereby opens a flow path from the work port, through the upper chamber, and the central chamber as an air supply for the active pump. Air driven by the active pump is exhausted through the lower chamber and an intake/exhaust port.

In summary, a pressure regulation apparatus in accordance with the present invention comprises:

means defining a first flow chamber having a port, a second flow chamber, and a third flow chamber having a port;

pump means for selectively pumping air from the second chamber to the first chamber or from the second chamber to the third chamber;

air dam means disposed in the third flow chamber; and valve means which, when in a first position, cooperates with the air dam means by isolating a sub-chamber of the third chamber from the third chamber port to provide a flow path from the third flow chamber port through the valve means and the pump means to the first flow chamber and the port thereof, and which, when in a second position, opens communication between the sub-chamber and the third chamber port to provide a second flow path from the port of the first flow chamber through the valve means and the pump means to the third flow chamber and the third flow chamber port.

According to the present invention, a pressure regulation apparatus also comprises:

means which define a first flow chamber that has a first port, a second flow chamber that has a second port, and a third flow chamber;

valve means which includes a valve member that is responsive to pressures within the chamber for moving between a first position and a second position;

pump means which selectively pumps air from the third chamber to the first chamber or to the second chamber to control the position of the valve member; and air dam means which cooperates with the valve means for partitioning the first flow chamber into two sub-chambers and which has valve seat means that receives the valve member when the valve member is in the second position to provide communication between the first port and the third flow chamber through one of the sub-chambers and to isolate the other sub-chamber from communication with the first port.

A bi-directional pneumatic transportation system for shuttling an item between a remote station and a local station in accordance with the present invention comprises:

a pneumatic tube network providing communication between the stations; and a driving apparatus for regulating air flow through the tube network in a remote send direction to transmit the item from the remote station to the local station and in a local send direction to transmit the item from the local station to the remote station, the driving apparatus including a housing partitioned internally to provide a first flow chamber having a work port which communicates with the pneumatic tube network, a second flow chamber having an air intake/exhaust port, and a third flow chamber, pump means which selectively pumps air from the third chamber to the first chamber in order to cause air flow through the tube network in the remote send direction, or to the second chamber in order to cause air flow through the tube network in the local send direction, valve means which includes a valve member movable between a first position and a second position in response to operation of the pump means, and air dam means which cooperates with the valve means to partition one of the flow chambers into two sub-chambers which are isolated from one another when the pump means causes air flow in the return direction and which are placed in communication when the pump means causes air flow in the send direction.

BRIEF DESCRIPTION OF THE DRAWINGS

Further aspects and features of the present invention will be even more apparent from the following detailed description and drawings, and the appended claims. In the drawings:

DETAILED DESCRIPTION OF THE INVENTION

Figure 1:
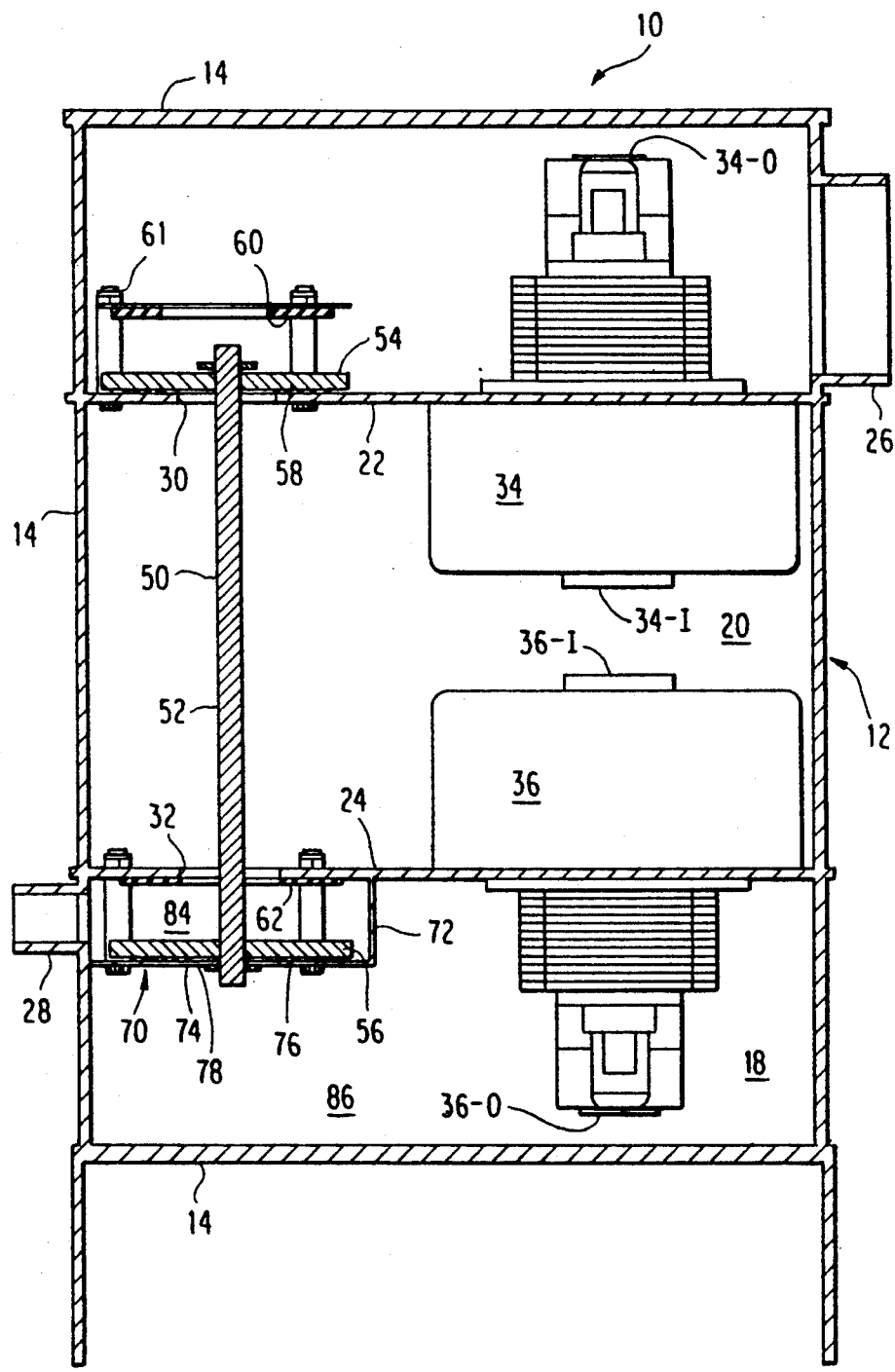
FIG. 1 is a side view of a first embodiment of a pressure regulation apparatus in accordance with the present invention with its valve means in a position to force air through the work port of the apparatus.
Figure 2:
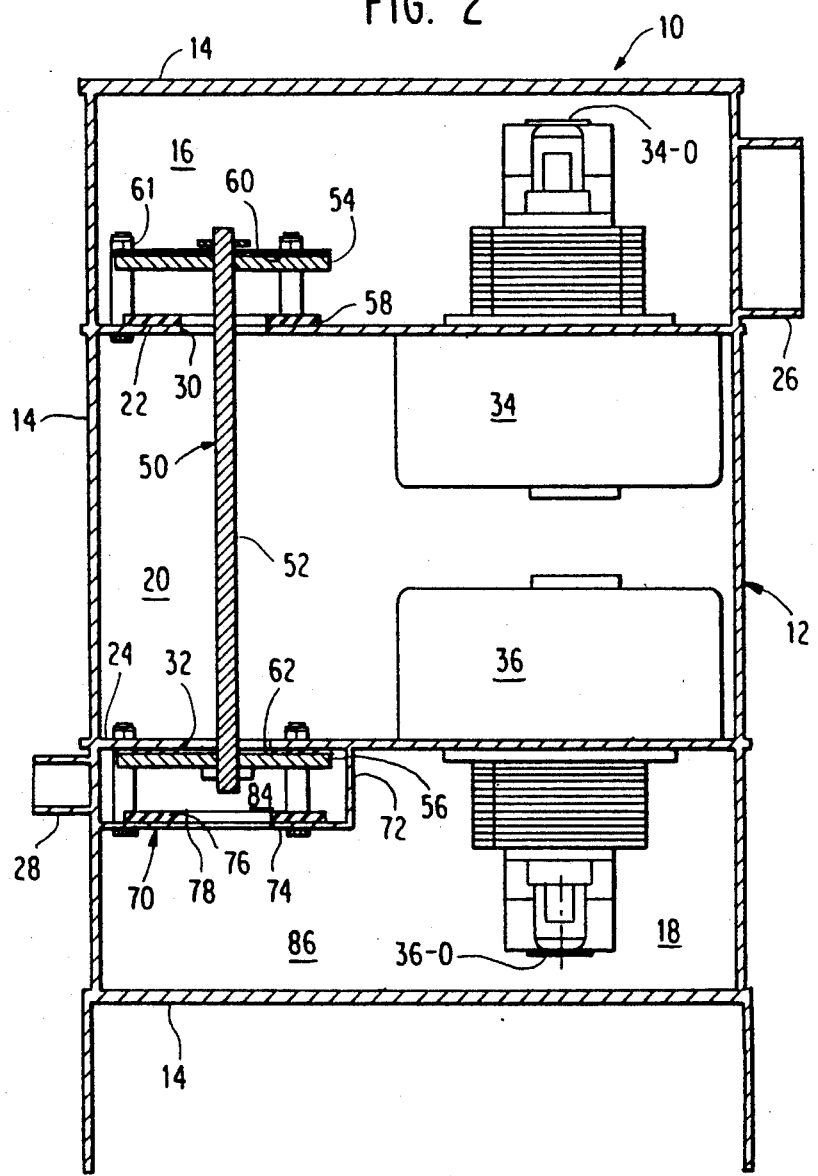
FIG. 2 is a side view, similar to FIG. 1, which illustrates the valve means in its other position wherein air from the work port is taken in and then exhausted at an intake/exhaust port of the apparatus.

In FIGS. 1 and 2, there is shown a first embodiment of a pressure regulation device 10 in accordance with the present invention. Regulator 10 is shown as comprising a generally rectangular housing 12 with exterior side, upper, and bottom walls 14. The interior of housing 12 is partitioned to define three flow chambers including an upper flow chamber 16, a lower flow chamber 18, and a central flow chamber 20 by generally parallel interior walls 22 and 24. Upper chamber 16 has a work port 26. Similarly, lower flow chamber 18 is provided with an intake/exhaust port 28. Regulator 10 is bi-directional, that is air can be taken in or exhausted at either of ports 26 and 28.

Bores 30 and 32 are provided through interior walls 22 and 24 respectively to provide communication between flow chambers 16, 20, and 18. Communication between flow chambers 16, 20, and 18 also is provided by two pump elements 34 and 36. Pump elements 34 and 36 are conventional low pressure, high volume pumps and are one-directional in the sense that both pumps are arranged to force air only from central chamber 20 to upper chamber 16 or lower chamber 18. According to the present invention, only two such pump elements are necessary. Pump 34 has an intake 34-I in central flow chamber 20 and an outlet 34-0 in upper chamber 16. On the other hand, lower pump unit 36 pulls air downwardly from its intake 36-I in central flow chamber 20 to its outlet 36-0 in lower flow chamber 18.

A spool-type valve member 50 is provided to alternatively obstruct bores 30 and 32. Preferably, spool-type metallic valve member 50 comprises a rod portion 52 that terminates in two opposing piston portions 54 and 56. Rod portion 52 has an elongate, generally cylindrical shape while pistons 54 and 56 have a generally disk-like construction. Valve member 50 is seen to traverse central flow chamber 20 so that its upper piston 54 is located within upper flow chamber 16 while its lower piston 56 is located within lower flow chamber 18. Upper flow chamber 16 also is seen to have two generally ring-like valve seat portions therein. Valve seat 58 concentrically surrounds the bore 30 in upper interior wall 22. Valve seat 60 is located upwardly from valve seat 58 and may be mounted within flow chamber 16 in any conventional way such as by spacers 61. Another valve seat 62, like valve seat 58, is provided in a concentric relationship around bore 32 on lower interior wall 24.

In the embodiment of FIGS. 1 and 2, an air dam means 70 is disposed within lower flow chamber 18. Air dam means 70 has a downwardly-extending section 72 which depends from lower interior wall 24. A generally horizontal section 74 connects the downwardly-extending section 72 to an exterior wall 14 of the housing 12 and provides support for a valve seat portion 76 for lower piston 56. Horizontal section 74 has a bore 78.

Valve seats 58, 60, 62, and 76 define two distinct positions for valve member 50. With particular reference to FIG. 1, piston 54 resting on valve seat 58, and piston 56 resting on seat 76 define the static or rest position for the valve member 50, which position the valve member assumes due to gravity when neither of the pumps 34, 36 is activated. This position of the valve member can be referred to as the "customer send" position because when pump 34 is activated, air is forced out of work port 26. Piston 54 thereby substantially prevents air flow between upper flow chamber 16 and central flow chamber 20 through port 30. Meanwhile, piston 56 is received on valve seat 76 to open a flow path from intake/exhaust port 28 through a sub-chamber 84 of lower flow chamber 18 and through bore 32 to provide an air source for upper pump 34. Valve member 50 and air dam means 70 is understood as cooperating to substantially isolate the remainder of lower chamber 18, hereinafter referred to as sub-chamber 86, when piston 56 engages valve seat 76. When pump 34 is activated, air is provided for upper pump 34 from intake/exhaust port 28 through bore 32. In the preferred embodiments, whenever pumps 34 and 36 are operative, central flow chamber 20 has a lower pressure than one of chambers 16 and 18 as the operative pump causes partial vacuum conditions in the central chamber. Operation of upper pump 34 increases the pressure in upper chamber 16 relative to chambers 18 and 20 whereby valve member 50 is held down in its customer send position shown in FIG. 1 by air pressure developed in the upper chamber. Pump 34 thus drives air entering central flow chamber 20 through bore 32 into upper flow chamber 16 and out of work port 26.

With particular reference to FIG. 2, to reverse the air flow in device 10, pump 34 is deactivated and pump 36 is activated. When pump 36 is activated, air dam 70 and piston 56 cause the pressure in sub-chamber 86 to increase. At the same time, pressure in chambers 16 and 20 decreases. As the pressure in sub-chamber 86 increases, valve member 50 responds by rising to its other operative position wherein piston 54 engages valve seat 60 and piston 56 engages valve seat 62. With valve member 50 in this second operative position which later will be referred to as the "teller send" position, a flow path is developed from work port 26 through bore 30 to provide a supply of air to lower pump 36. Also, movement of the valve member 50 to its second position reconnects sub-chamber 86 with sub-chamber 84 and intake/exhaust port 28. Air forced into now opened sub-chamber 86 by pump 36 is directed outwardly through sub-chamber 86 through bore 78 to sub-chamber 84 and intake/exhaust port 28.

Figure 3:
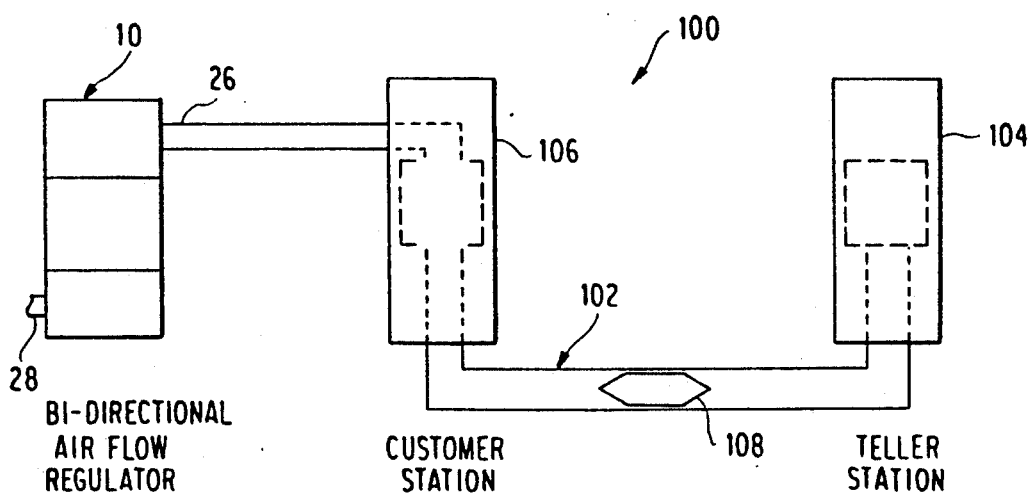
FIG. 3 is a schematic block diagram of a pneumatic bank teller carrier system incorporating the air pressure regulation apparatus in accordance with the present invention.

FIG. 3 schematically depicts a bi-directional pneumatic transportation system 100 in the form of a bank teller network which incorporates air pressure regulator 10. Regulator 10 is placed in communication with the pneumatic tube network 102 via work port 26. System 100 is shown to have a teller station 104 connected to a customer station 106; however, it should be kept in mind that additional teller and customer stations are contemplated in a network for typical banks. A carrier 108 is depicted as being transported within the connecting tube network 102. For the customer to send carrier 108 to the teller station 104 from the customer station 106, all that is required is for pump 34 to be activated to force air out through work port 26 until the carrier arrives at the teller station. When the carrier arrives there, it is contemplated that both pumps 34 and 36 of regulator 10 would be deactivated and the valve member 50 would thus remain in its customer send position. When it is time for the teller to return the carrier 108 to the customer station 106, pump 36 is activated to switch valve member 50 to its teller send position in order to reverse air flow in the network 100 to transport the carrier.

Figure 4:
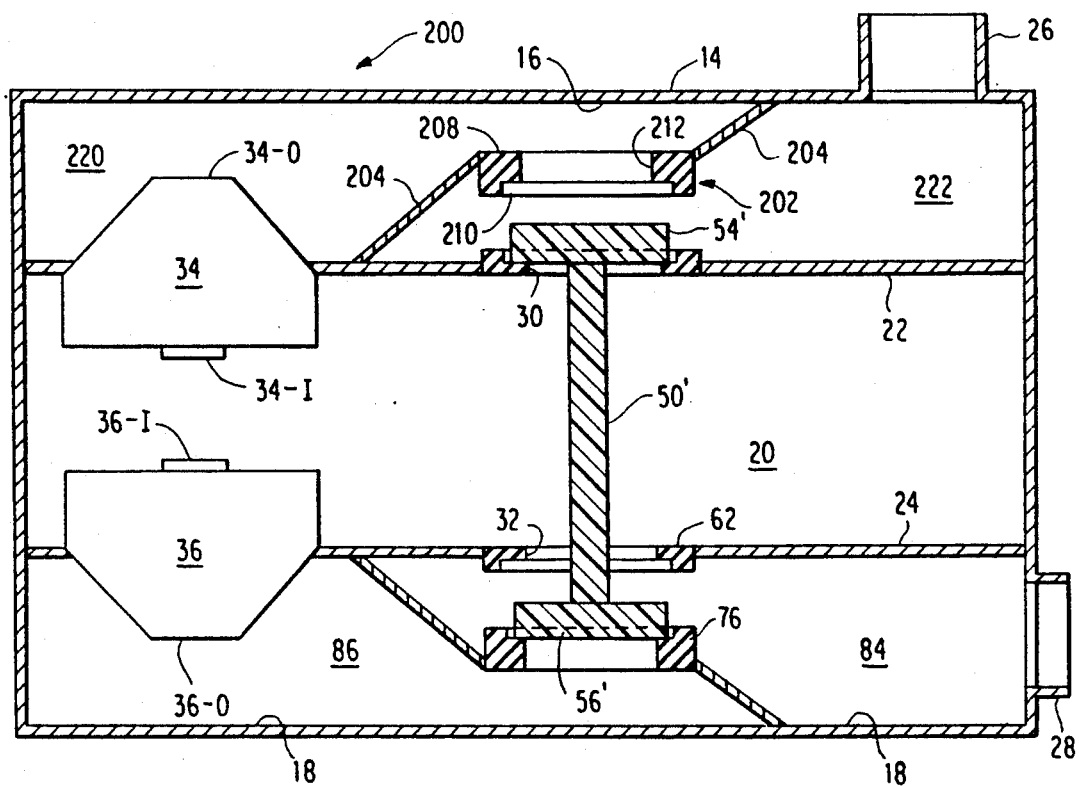
FIG. 4 is a side view schematically illustrating another embodiment of the air pressure regulation apparatus in accordance with the present invention.
Figure 5:
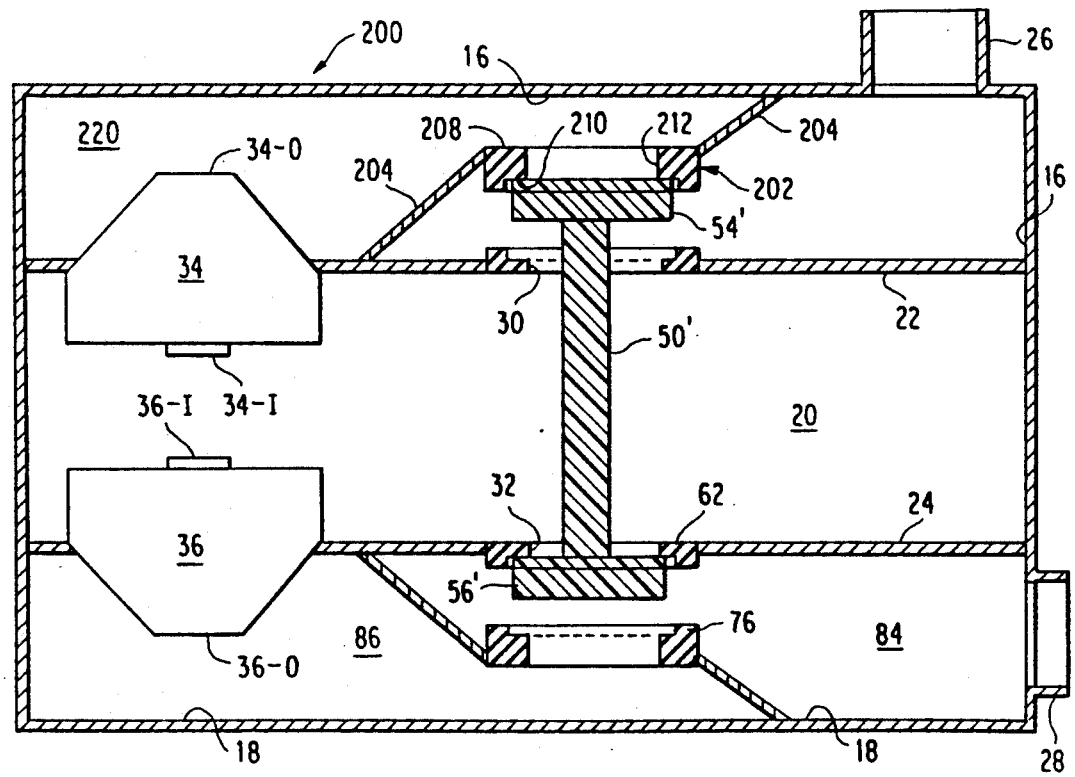
FIG. 5 is another side view of the apparatus of FIG. 4.

FIGS. 4 and 5 show an alternative embodiment of a pressure regulation system 200 according to the present invention. System 200 differs from system 10 by inclusion of a second air dam means 202 disposed within an upper flow chamber 16. The arrangement of two air dams in system 200 eliminates any dependence on gravity, and thus system 200 can be operated in any orientation such as lying on its side. Also, in system 200, the valve member 50' comprises a plastic material. Otherwise, system 200 is similar to system 10. Air dam means 202 has a section 204 which extends between the upper wall 14 to interior wall 22 and a horizontal section 208 which connects section 204 and provides a valve seat 210. Section 208 likewise has a bore 212.

In operation, system 200 likewise is similar to system 10. With particular reference to FIG. 4, to provide air flow from intake/exhaust port 28 to work port 26 of system 200, upper pump 34 is activated to draw air into central flow chamber 20 through port 32, open subchamber 84 of lower flow chamber 18, and exhaust port 28. Pressure is created in sub-chamber 220 defined by the air dam 202 and the piston 54'. Pressure in sub-chamber 220 exerts force to bias valve member 50' to its customer send position so that the pressure created in sub-chamber 220 is released through the now connected sub-chamber 222 and work port 26. Upper pump 34 thereby is provided with air through the flow path defined by central flow chamber 20, bore 32, sub-chamber 84, and air intake/exhaust port 28.

With particular attention now invited to FIG. 5, air flow in system 200 is reversed by deactivating upper pump 34 and activating lower pump 36. When pump 36 is activated, air is forced into now closed sub-chamber 86 from central flow chamber 20 through the activated pump. Pressure is thus created in sub-chamber 86 until piston 56' is pushed upwardly out of valve seat 76 into engagement with valve eat 62 to open a flow passage through work port 26, sub-chamber 222, bore 30, and central chamber 20 to the intake 36-I of pump 36. Sub-chamber 220 is isolated from communication with work port 26 and the sub-chambers 86 and 84 of lower flow chamber 18 are placed in communication to exhaust incoming air from work port 26 at intake/exhaust port 28.

It is to be understood that there can be various changes and modifications to the preferred embodiments of the present invention disclosed herein, which changes and/or modifications may be made by one of ordinary skill in the art, but such would still result in a system well within the scope of the invention as set forth in the claims.

What is claimed is:

1. A pressure regulation apparatus comprising:
    means defining a first flow chamber having a port, a second flow chamber, and a third flow chamber having a port;
    pump means for selectively pumping air from said second chamber to said first chamber or from said second chamber to said third chamber;
    air dam means disposed in said third flow chamber; and
    valve means which, when in a first position, cooperates with said air dam means by isolating a subchamber of said third chamber from said third chamber port to provide a flow path from said third flow chamber port through said valve means and said pump means to said first flow chamber and said port thereof, and which, when in a second position, opens communication between said subchamber and said third chamber port to provide a second flow path from said port of said first flow chamber through said valve means and said pump means to said third flow chamber and said third flow chamber port.

2. A pressure regulation apparatus as claimed in claim 1, wherein said valve means comprises a piston and wherein said air dam means includes first valve seat means for receiving said piston to isolate said sub-chamber.

3. A pressure regulation apparatus as claimed in claim 2, wherein said means defining said flow chambers provides second valve seat means in said third flow chamber for receiving said piston when said valve means is in said second position.

4. A pressure regulation apparatus as claimed in claim 3, wherein said means defining said flow chambers comprises a housing that has first and second internal walls and side walls which delineate said chambers and wherein said air dam means comprises a downwardly-extending wall section which depends from said first interior wall, and a generally horizontally-extending wall section which connects said downwardly-extending section to said side walls.

5. A pressure regulation apparatus as claimed in claim 4, wherein said sub-chamber is defined by said first interior wall, said side walls, a bottom wall of said housing, said downwardly-extending wall section and said horizontally-extending wall section, and wherein another sub-chamber of said third flow chamber is defined by at least one of said side walls, said first interior wall and said downwardly-extending and horizontally-extending wall sections.

6. A pressure regulation apparatus as claimed in claim 5, wherein said valve means comprises a spool-type valve member having said piston at an end portion thereof and another piston at another end portion thereof.

7. A pressure regulation apparatus as claimed in claim 6, wherein said second internal wall has a third valve seat means in which said another piston is received when said valve means is in said first position and wherein a fourth valve seat means is located in said first flow camber for receiving said another piston therein when said valve means is in said second position.

8. A pressure regulation apparatus as claimed in claim 7, wherein said second chamber remains under partial vacuum conditions when said pump means pumps air from said second chamber to either of said first or said third chambers.

9. A pressure regulation apparatus as claimed in claim 2, wherein said pump means comprises a first pump element and a second pump element and wherein said valve means assumes said first position in response to activation of said first pump element and said second position in response to activation of said second pump element.

10. A pressure regulation apparatus as claimed in claim 1, wherein said apparatus comprises another air dam means which is disposed in said first chamber and which cooperates with said valve means by obstructing a sub-chamber of said first chamber from said port thereof when said valve means is in said second position.

11. A pressure regulation apparatus comprising:
means which define a first flow chamber that has a first port, a second flow chamber that has a second port, and a third flow chamber;
valve means which includes a valve member that is responsive to pressures within said chambers for moving between a first position and a second position;
pump means which selectively pumps air from said third chamber to said first chamber or to said second chamber to control the position of said valve member; and
air dam means which cooperates with said valve means for partitioning said first flow chamber into two sub-chambers and which has valve seat means that receives said valve member when said valve member is in said second position to provide communication between said first port and said third flow chamber through one of said sub-chambers and to isolate said other sub-chamber from communication with said first port.

12. A pressure regulation apparatus as claimed in claim 11, wherein said pump means comprises a first pump for creating relatively higher pressure in said first chamber to move said valve member to said first position and a second pump for creating relatively higher pressure in said second chamber to move said valve member to said second position.

13. A pressure regulation apparatus as claimed in claim 12, wherein said third chamber remains in partial vacuum conditions when said pump means pumps the air from said third chamber to either of said first or said second chambers.

14. A pressure regulation apparatus as claimed in claim 11, wherein said valve member is a spool-like valve member which extends through said third flow chamber into each of said first and second flow chambers.

15. A pressure regulation apparatus as claimed in claim 14, wherein said apparatus further comprises an air dam means in said second flow chamber.

16. A bi-directional pneumatic transportation system for shuttling an item between a remote station and a local station, said system comprising:
a pneumatic tube network providing communication between the stations; and
a driving apparatus for regulating air flow through the tube network in a remote send direction to transmit the item from the remote station to the local station and in a local send direction to transmit the item from the local station to the remote station, the driving apparatus including
a housing partitioned internally to provide a first flow chamber having a work port which communicates with the pneumatic tube network, a second flow chamber having an air intake/exhaust port, and a third flow chamber,
pump means which selectively pumps air from the third chamber to the first chamber in order to cause the air flow through the tube network in the remote send direction, or to the second chamber in order to cause the air flow through the tube network in the local send direction,
valve means which includes a valve member movable between a first position and a second position in response to operation of the pump means, and
air dam means which cooperates with the valve means to partition one of the flow chambers into two sub-chambers which are isolated from one another when the pump means causes the air flow in the remote send direction and which are placed in communication when the pump means causes the air flow in the local send direction.

17. A bi-directional pneumatic transportation system as claimed in claim 16, wherein the pump means comprises a first pump for creating relatively higher pressure in one of the first and second chambers to cause the valve member to assume the first position and a second pump for creating relatively higher pressure in the other of the first and second chambers to cause the valve member to move to the second position.

18. A bi-directional pneumatic transportation system as claimed in claim 16, wherein the third chamber remains under partial vacuum conditions when the pump means pumps the air from the third chamber to either of the first or the second chambers.

19. A bi-directional pneumatic transportation system as claimed in claim 16, wherein the valve member is a spool-like member which extends through the third flow chamber into each of the first and second flow chambers.

20. A bi-directional pneumatic transportation system as claimed in claim 19, wherein the air dam means and the housing provide valve seats for the spool-like member.

* * * * *